(12) United States Patent
Connellan et al.

(10) Patent No.: US 10,719,143 B2
(45) Date of Patent: Jul. 21, 2020

(54) INPUT DEVICE FOR USE IN AN AUGMENTED/VIRTUAL REALITY ENVIRONMENT

(71) Applicant: Logitech Europe S.A., Lausanne (CH)

(72) Inventors: Andreas Connellan, Dublin (IE); Fergal Corcoran, County Cork (IE); Pierce Brady, County Cork (IE)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 16/054,944

(22) Filed: Aug. 3, 2018

(65) Prior Publication Data
US 2020/0042111 A1 Feb. 6, 2020

(51) Int. Cl.
| | |
|---|---|
| *G06F 3/033* | (2013.01) |
| *G06F 3/0354* | (2013.01) |
| *G06F 3/042* | (2006.01) |
| *G02B 27/01* | (2006.01) |
| *G06F 3/0481* | (2013.01) |
| *G06F 3/0488* | (2013.01) |
| *G06T 19/00* | (2011.01) |

(52) U.S. Cl.
CPC ..... *G06F 3/03545* (2013.01); *G02B 27/0172* (2013.01); *G06F 3/0425* (2013.01); *G06F 3/04815* (2013.01); *G06F 3/04883* (2013.01); *G06T 19/006* (2013.01)

(58) Field of Classification Search
CPC ....... G02B 27/017; G06F 3/011; G06F 3/012; G06F 3/0346; G06F 3/04815; G06T 19/006

See application file for complete search history.

(56) References Cited

U.S. PATENT DOCUMENTS

| | | | |
|---|---|---|---|
| 2013/0021288 A1* | 1/2013 | Karkkainen | G06F 3/016 345/173 |
| 2016/0062492 A1* | 3/2016 | Geller | G06F 3/03545 345/179 |

* cited by examiner

*Primary Examiner* — Insa Sadio
(74) *Attorney, Agent, or Firm* — Kilpatrick Townsend & Stockton LLP

(57) ABSTRACT

In some embodiments, a stylus device can be configured for use in an augmented/virtual (AR/VR) reality environment and can include a first portion and a second portion, where the first portion of the housing is substantially linear and can be configured to be held by a user's hand while the stylus device is in use. The first portion may include a tip configured to operate as an interface between the stylus device and objects within the AR/VR environment. The second portion of the housing may be non-linear and bent to traverse three dimensions including a section of the second portion that is bent longitudinally toward a line co-linear with the first portion of the housing. In some cases, the second portion of the housing may include a plurality of emitters or sensors configured for facilitating a tracking of the stylus device in three-dimensional space within the AR/VR environment.

18 Claims, 7 Drawing Sheets

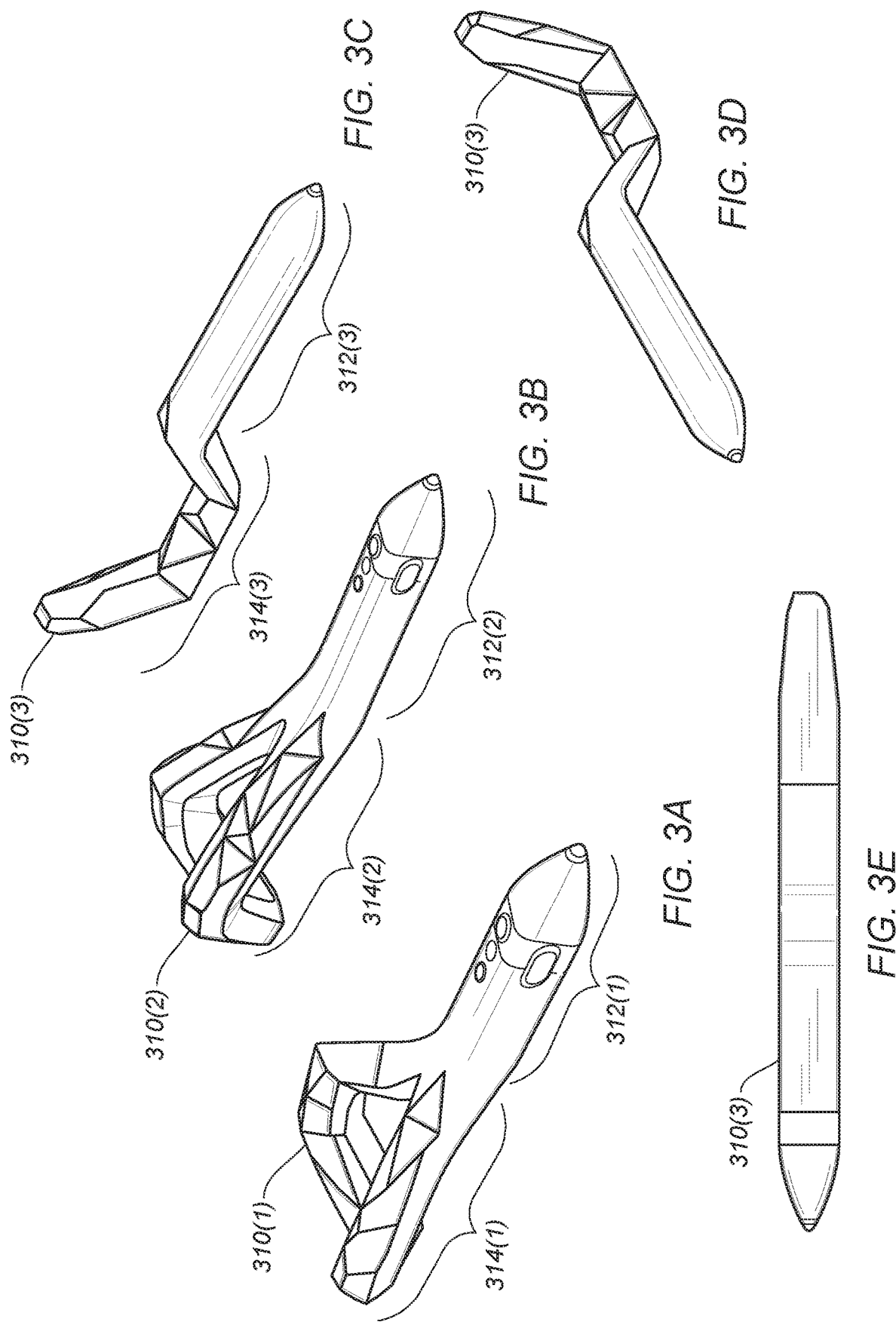

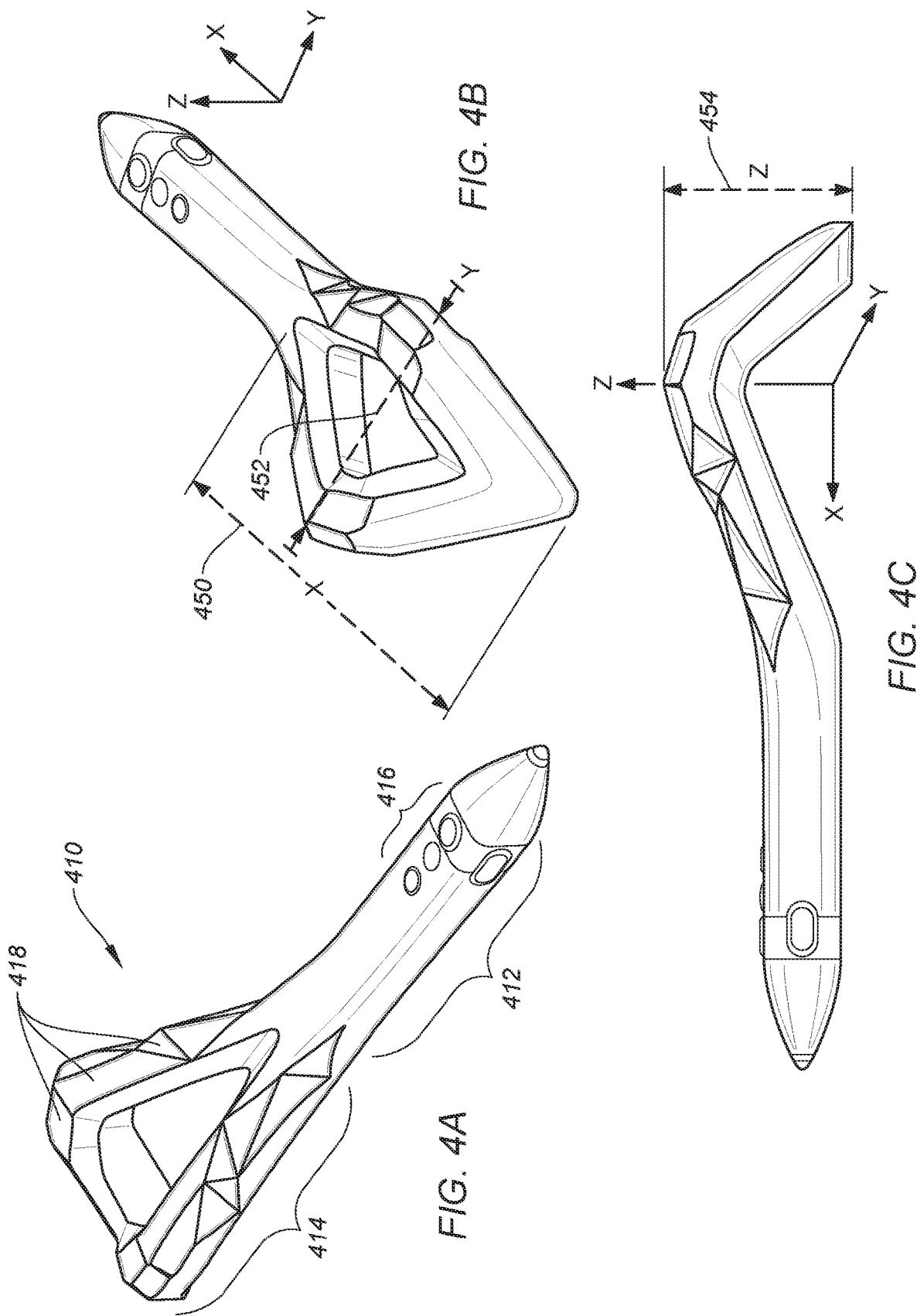

INPUT DEVICE FOR USE IN AN AUGMENTED/VIRTUAL REALITY ENVIRONMENT

BACKGROUND

Virtual, mixed, or augmented reality can be associated with a variety of applications that comprise immersive, highly visual, computer-simulated environments. These environments, commonly referred to as augmented-reality (AR)/virtual-reality (VR) environments, can simulate a physical presence of a user in a real or imagined world. The computer simulation of these environments can include computer rendered images, which can be presented by means of a graphical display. The display can be arranged as a head mounted display (HMD) that may encompass all or part of a user's field of view.

A user can interface with the computer-simulated environment by means of a user interface device or peripheral device. A common controller type in many contemporary AR/VR systems is the pistol grip controller, which can typically operate with three or six degrees-of-freedom (DOF) of tracked movement, depending on the particular system. When immersed in a computer-simulated AR/VR environment, the user may perform complex operations associated with the interface device, including simulated movement, object interaction and manipulation, and more. Despite their usefulness, pistol grip controllers in contemporary AR/VR systems tend to be bulky, unwieldy, cumbersome, and can induce fatigue in a user due to its weight and large tracking features that often include an obtrusive and protruding donut-shaped structure. The pistol grip shape can help minimize fatigue as a user can typically hold objects in a pistol grip configuration for longer periods of time, but at the cost of only allowing coarse and inarticulate movement and ungainly control. Thus, there is need for improvement in interface devices when operating within virtualized environments, especially when performing tasks that require a high degree of precision and fine control.

BRIEF SUMMARY

In some embodiments, a stylus device can be configured for use in an augmented/virtual (AR/VR) reality environment, the stylus comprising a housing including: a first portion; and a second portion; one or more processors disposed in the housing; and a communications module disposed in the housing and controlled by the one or more processors, the communications module configured to establish a wireless electronic communication channel between the stylus device and at least one host computing device. The first portion of the housing may be substantially linear and can be configured to be held by a user's hand while the stylus device is in use. The first portion may include an input element configured to generate control signals in response to being activated by the user's hand; and a tip at an end of the first portion configured to operate as an interface between the stylus device and objects within the AR/VR environment. The second portion of the housing may be non-linear and can bend to traverse through three dimensions (e.g., x, y, and z dimensions of a Cartesian coordinate systems) including a section of the second portion that is bent longitudinally toward a line that is co-linear with the first portion of the housing. In some cases, the second portion of the housing may include a plurality of emitters or sensors configured for facilitating a tracking of the stylus device in three-dimensional space within the AR/VR environment.

In certain embodiments, a section of the second portion of the housing may form a polygonal loop (e.g., hexagonal loop, diamond shaped loop, circular loop, spherical loop, hemi-spherical loop, octagonal loop, etc.). In some cases, the second portion of the housing may include a polygonal cross-section through at least a portion of the polygonal loop (e.g., hexagonal cross-section, diamond cross-section, circular cross-section, octagonal cross-section, etc.). The second portion of the housing can include a plurality of planar facets, wherein the plurality of emitters or sensors may be configured on some or all of the plurality of planar facets. Some or all of the plurality of planar facets can be oriented to face a different direction from one another in three-dimensional space. In some cases, some or all of the planar facets can be oriented such that at least four of the planar facets are visible from any point 360 degrees around the stylus device. To illustrate, if the first section of the housing (which can be configured to be held by a user's hand in a pen-grip configuration) in substantially linear, then any point 360 degrees normal to the first section can be viewed such that at least four of the planar facets and/or emitters or sensors can be detected. Another simplified example can be an axle/wheel relationship where the first portion of the stylus device (the substantially linear portion) can be the axle, and the 360 degrees of viewing can be the wheel's orientation relative to the axel. However, in some cases, detection can be achieved at any point around the stylus device (e.g., at any location spherically around stylus device). In some cases, a center of gravity for the stylus device can be at an interface between the second portion and the first portion. Further, the stylus device can be balanced longitudinally and latitudinally (e.g., length-wise and width-wise) at an interface between the second portion and the first portion, as shown in FIG. 6B.

In certain embodiments, an input device configured for use in an augmented/virtual (AR/VR) reality environment can include a housing including: a substantially linear first portion configured to be held by a user's hand while the input device is in use; and a second portion that is non-linear and bends to traverse through three dimensions, wherein the second portion of the housing includes a plurality of emitters or sensors configured for facilitating a tracking of the input device in three-dimensional space within the AR/VR environment. In some cases, a section of the second portion can be bent longitudinally toward a line co-linear with the first portion of the housing. In some embodiments, a section of the second portion of the housing can form a hexagonal loop and the housing includes a hexagonal cross-section through at least a portion of the hexagonal loop. The second portion of the housing may include a plurality of planar facets, where the plurality of emitters or sensors are configured on the plurality of planar facets. Each of the plurality of planar facets can be oriented to face a different direction from one another in three-dimensional space. In some cases, the plurality of planar facets are oriented such that at least four of the planar facets are visible from any point 360 degrees around the input device. In certain embodiments, the input device may be a stylus device. A center of gravity for the input device can be at the interface between the second portion and the first portion such that the input device is configured to balance unsupported on a space between a forefinger and thumb of the user's hand when the user's hand is oriented in an input device in-use position. In some implementations, the input device can be balanced longitudinally and latitudinally at an interface between the second portion and the first portion.

In further embodiments, an input device configured for use in an augmented/virtual (AR/VR) reality environment can include a housing including: a first portion; and a second portion; where the first portion of the housing may be configured to be held by a user's hand while the input device is in use, where the second portion of the housing may be non-linear and bent to traverse through three dimensions and includes a section forming a hexagonal loop having a hexagonal cross-section, where the hexagonal loop can include a section that is bent longitudinally toward a line co-linear with the first portion of the housing, where the hexagonal loop may include a plurality of planar facets, and where a plurality of emitters or sensors are configured on the plurality of planar facets that are configured for facilitating a tracking of the input device in three-dimensional space within the AR/VR environment. In some cases, each of the plurality of planar facets can be oriented to face a different direction from one another in three-dimensional space, and each of the plurality of planar facets may be oriented such that at least four of the planar facets are visible from any point 360 degrees around the input device.

BRIEF DESCRIPTION OF THE DRAWINGS

Aspects, features and advantages of embodiments of the present disclosure will become apparent from the following description of embodiments in reference to the appended drawings.

FIG. 3A shows a stylus device configured for operation in an AR/VR environment, according to certain embodiments.

FIG. 3B shows a second implementation of a stylus device configured for operation in an AR/VR environment, according to certain embodiments.

FIGS. 3C-3E show a third implementation of a stylus device configured for operation in an AR/VR environment, according to certain embodiments.

FIG. 4A shows aspects of a stylus device for use in an AR/VR environment, according to certain embodiments.

FIG. 4B shows aspects of a stylus device for use in an AR/VR environment, according to certain embodiments.

FIG. 4C shows aspects of a stylus device for use in an AR/VR environment, according to certain embodiments.

DETAILED DESCRIPTION

Figure 1:
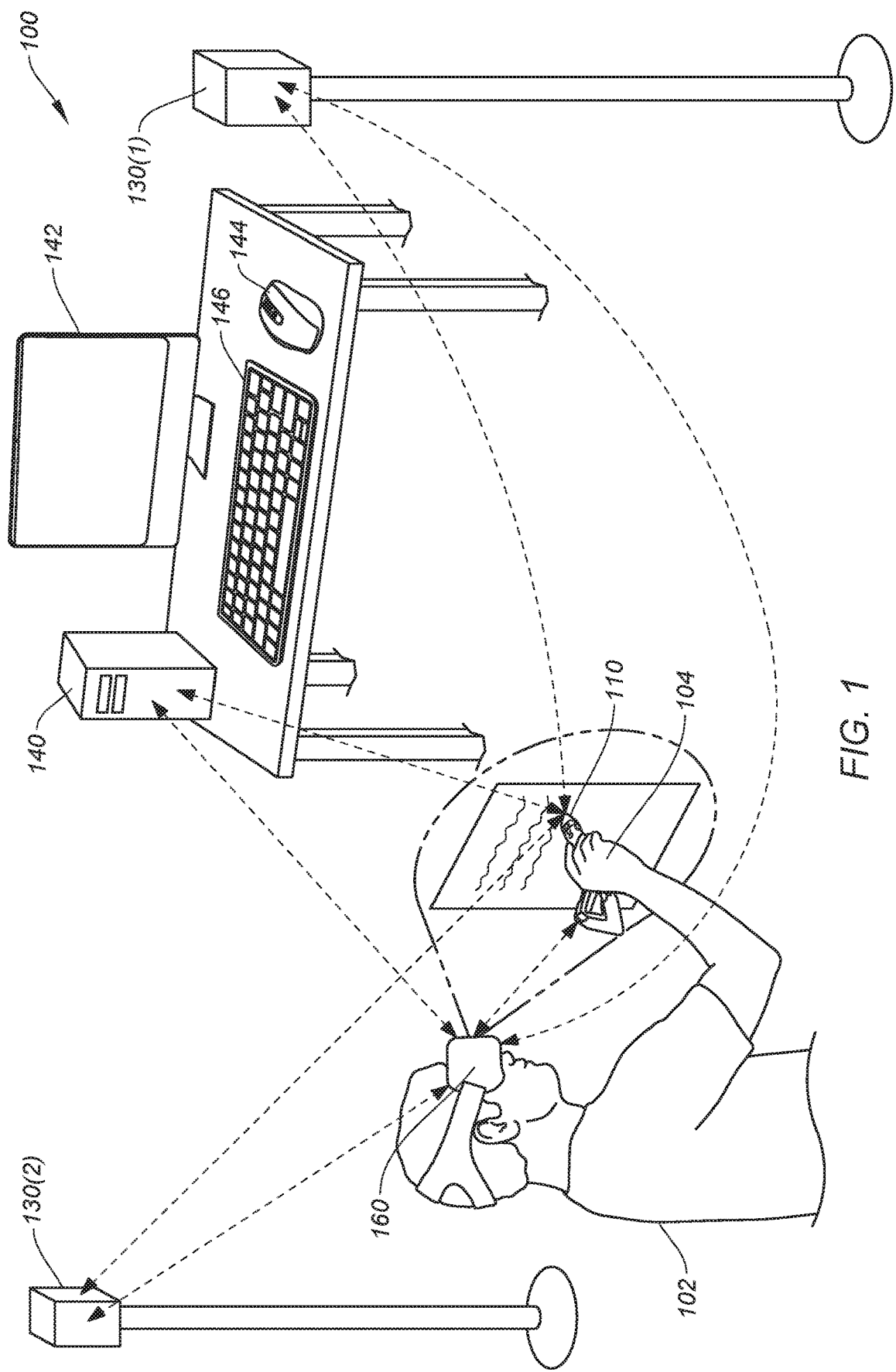
FIG. 1 shows a user operating a stylus device in an augmented/virtual reality environment, according to certain embodiments.

Embodiments of this invention are generally directed to control devices configured to operate in AR/VR-based systems. More specifically, some embodiments relate to a stylus device with a novel design architecture having improved ergonomic and tracking characteristics.

In the following description, for the purpose of explanation, numerous examples and details are set forth in order to provide an understanding of embodiments of the present invention. It will be evident, however, to one skilled in the art that certain embodiments can be practiced without some of these details, or with modifications or equivalents thereof.

To provide a high level, broad understanding of some aspects of the present disclosure, a non-limiting summary of certain embodiments are presented here. In many conventional AR/VR systems currently in the market, pistol grip-type controls are commonplace but are fraught with ergonomic issues, as described above. In summary, conventional pistol grip controllers (i.e., input devices) are often inarticulate and can prevent users from performing high precision operations due to their bulky and cumbersome designs, as well as the biomechanics of a user's hand in the pistol grip configuration, which is generally conducive to high precision movements or control. Thus, aspects of the invention introduce a novel input device that can provide a user with a significantly higher degree of precision and control, less user fatigue, and adaptability to a number of tracking protocols common to contemporary AR/VR systems. Some embodiments include a stylus-type device configured to be held like a pen that is light, has a balanced center of gravity, is configured to remain in-line with a user's wrist during use, and includes a tracking portion that is configured in a way to prevent light-of-sight occlusion during use, to make for an ergonomically sound, high precision input device that can be used for extended periods of time with low fatigue.

In certain exemplary embodiments, the input device can be a stylus device configured for use in an augmented/virtual (AR/VR) reality environment that includes a housing with a bottom portion and a top portion, as shown for example in FIGS. 3A-7. One or more processors and a communications module configured to establish a wireless electronic communication between the stylus device and at least one host computing device can be disposed in the housing. In some cases, the bottom portion of the housing can be substantially linear and configured to be held by a user's hand while the stylus device is in use. The bottom portion can include one or more input elements configured to generate control signals in response to being activated by the user's hand and a tip at an end of the bottom portion configured to operate as an interface between the stylus device and objects within the AR/VR environment. The top portion of the housing can be formed into a hexagonal loop that traverses three dimensions and may include a hexagonal cross-section through at least a portion of the hexagonal loop. The angle between each plane of the hexagonal loop and/or the cross-section thereof may be approximately 30 degrees, but not necessarily symmetric (e.g., some angles may be greater or less than 30 degrees). The hexagonal loop may be bent longitudinally downward toward and in-line with a wrist of a user when the stylus is in use, which can prevent obfuscation for the user's line-of-sight when operating the stylus device. The hexagonal loop can include a number of planar facets that may be oriented to face a different direction from one another in three dimensional space. A number of emitters or sensors can be configured on some or all of the planar facets, which can facilitate a tracking of the stylus device in three-dimensional space within the AR/VR environment. The use of emitters (e.g., infra-red LEDs) and/or sensors (e.g., infra-red detectors) may depend on the type of tracking infra-structure used by the AR/VR system. The planar facets can be oriented such that at least four of the planar facets are visible (e.g., detectable LED emission) from any point 360 degrees axial to the orientation of the stylus device (e.g., completely around the sides of the stylus device), although some embodiments may have facets configured on different portions of the hexagonal loop that allow at least 3 or 4 to be visible from anywhere around the stylus device. In some implementations, a center of gravity for the stylus device can be at the interface between the top portion and the bottom portion. While in use, the top portion is compact enough such that it may not extend beyond the wrist of the user laterally (e.g., does not hang over the edge of the arm) when the stylus device is in use. In operation, the bottom portion of the housing may be held by a user's hand in a pen-grip configuration. One of ordinary skill in the art with the benefit of this disclosure would understand the many variations, modifications, and alternative embodiments thereof that extend beyond the non-limiting example described above.

Definitions

The present disclosure may be better understood in view of the following explanations:

As used herein, the terms "computer simulation" and "virtual reality environment" may refer to a virtual reality, augmented reality, mixed reality, or other form of visual, immersive computer-simulated environment provided to a user. As used herein, the terms "virtual reality" or "VR" may include a computer-simulated environment that replicates an imaginary setting. A physical presence of a user in this environment may be simulated by enabling the user to interact with the setting and any objects depicted therein. Examples of VR environments may include: a video game; a medical procedure simulation program including a surgical or physiotherapy procedure; an interactive digital mock-up of a designed feature, including a computer aided design; an educational simulation program, including an E-leaning simulation; or other like simulation. The simulated environment may be two or three-dimensional.

As used herein, the terms "augmented reality" or "AR" may include the use of rendered images presented in conjunction with a real-world view. Examples of AR environments may include: architectural applications for visualization of buildings in the real-world; medical applications for augmenting additional information to a user during surgery or therapy; gaming environments to provide a user with an augmented simulation of the real-world prior to entering a VR environment.

As used herein, the terms "mixed reality" or "MR" may include use of virtual objects that are rendered as images in conjunction with a real-world view of an environment wherein the virtual objects can interact with the real world environment. Embodiments described below can be implemented in AR, VR, or MR environments.

As used herein, the term "real-world environment" or "real-world" may refer to the physical world (also referred to herein as "physical environment." Hence, term "real-world arrangement" with respect to an object (e.g., a body part or user interface device) may refer to an arrangement of the object in the real-world and may be relative to a reference point. The term "arrangement" with respect to an object may refer to a position (location and orientation). Position can be defined in terms of a global or local coordinate system.

As used herein, the term "rendered images" or "graphical images" may include images that may be generated by a computer and displayed to a user as part of a virtual reality environment. The images may be displayed in two or three dimensions. Displays disclosed herein can present images of a real-world environment by, for example, enabling the user to directly view the real-world environment and/or present one or more images of a real-world environment (that can be captured by a camera, for example).

As used herein, the term "head mounted display" or "HMD" may refer to a display to render images to a user. The HMD may include a graphical display that is supported in front of part or all of a field of view of a user. The display can include transparent, semi-transparent or non-transparent displays. The HMD may be part of a headset. The graphical display of the HMD may be controlled by a display driver, which may include circuitry as defined herein.

As used herein, the term "electrical circuitry" or "circuitry" may refer to, be part of, or include one or more of the following or other suitable hardware or software components: a processor (shared, dedicated, or group); a memory (shared, dedicated, or group), a combinational logic circuit, a passive electrical component, or an interface. In certain embodiment, the circuitry may include one or more virtual machines that can provide the described functionality. In certain embodiments, the circuitry may include passive components, e.g. combinations of transistors, transformers, resistors, capacitors that may provide the described functionality. In certain embodiments, the circuitry may be implemented using, or functions associated with the circuitry may be implemented using, one or more software or firmware modules. In some embodiments, circuitry may include logic, at least partially operable in hardware. The electrical circuitry may be centralized or distributed, including being distributed on various devices that form part of or are in communication with the system and may include: a networked-based computer, including a remote server; a cloud-based computer, including a server system; or a peripheral device.

As used herein, the term "processor(s)" or "host/local processor(s)" or "processing resource(s)" may refer to one or more units for processing including an application specific integrated circuit (ASIC), central processing unit (CPU), graphics processing unit (GPU), programmable logic device (PLD), microcontroller, field programmable gate array (FPGA), microprocessor, digital signal processor (DSP), or other suitable component. A processor can be configured using machine readable instructions stored on a memory. The processor may be centralized or distributed, including distributed on various devices that form part of or are in communication with the system and may include: a networked-based computer, including a remote server; a cloud-based computer, including a server system; or a peripheral device. The processor may be arranged in one or more of: a peripheral device (e.g., a stylus device), which may include a user interface device and/or an HMD; a computer (e.g, a personal computer or like device); or other device in communication with a computer system.

As used herein, the term "computer readable medium/ media" may include conventional non-transient memory, for example, random access memory (RAM), an optical media, a hard drive, a flash drive, a memory card, a floppy disk, an optical drive, and/or combinations thereof. It is to be understood that while one or more memories may be located in the same physical location as the system, the one or more memories may be located remotely from the host system, and may communicate with the one or more processor via a computer network. Additionally, when more than one memory is used, a first memory may be located in the same physical location as the host system and additional memories may be located in a remote physical location from the host system. The physical location(s) of the one or more memories may be varied. Additionally, one or more memories may be implemented as a "cloud memory" (i.e., one or more memory may be partially or completely based on or accessed using the network).

As used herein, the term "communication resources" may refer to hardware and/or firmware for electronic information transfer. Wireless communication resources may include hardware to transmit and receive signals by radio, and may include various protocol implementations, e.g., 802.11 standards described in the Institute of Electronics Engineers (IEEE), Bluetooth™, ZigBee, Z-Wave, Infra-Red (IR), RF, or the like. Wired communication resources may include; a modulated signal passed through a signal line, said modulation may accord to a serial protocol such as, for example, a Universal Serial Bus (USB) protocol, serial peripheral interface (SPI), inter-integrated circuit (I2C), RS-232, RS-485, or other protocol implementations.

As used herein, the term "network" or "computer network" may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, and/or another type of suitable network.

As used herein, the term "sensor system" may refer to a system operable to provide position information concerning input devices, peripherals, and other objects in a physical world that may include a body part or other object. The term "tracking system" may refer to detecting movement of such objects. The body part may include an arm, leg, torso, or subset thereof including a hand or digit (finger or thumb). The body part may include the head of a user. The sensor system may provide position information from which a direction of gaze and/or field of view of a user can be determined. The object may include a peripheral device interacting with the system. The sensor system may provide a real-time stream of position information. In an embodiment, an image stream can be provided, which may represent an avatar of a user. The sensor system and/or tracking system may include one or more of: a camera system; a magnetic field based system; capacitive sensors; radar; acoustic; other suitable sensor configuration, optical, radio, magnetic, and inertial technologies, such as lighthouses, ultrasonic, IR/LEDs, SLAM tracking, light detection and ranging (LIDAR) tracking, ultra-wideband tracking, and other suitable technologies as understood to one skilled in the art. The sensor system may be arranged on one or more of: a peripheral device, which may include a user interface device, the HMD; a computer (e.g., a P.C., system controller or like device); other device in communication with the system.

As used herein, the term "camera system" may refer to a system comprising a single instance or a plurality of cameras. The camera may comprise one or more of: a 2D camera; a 3D camera; an infrared (IR) camera; a time of flight (ToF) camera. The camera may include a complementary metal-oxide-semiconductor (CMOS), a charge-coupled device (CCD) image sensor, or any other form of optical sensor in use to form images. The camera may include an IR filter, which can be used for object tracking. The camera may include a red-green-blue (RGB) camera, which may be used for generation of real world images for augmented or mixed reality simulations. In an embodiment different frames of a single camera may be processed in an alternating manner, e.g., with an IR filter and for RGB, instead of separate cameras. Images of more than one camera may be stitched together to give a field of view equivalent to that of the user. A camera system may be arranged on any component of the system. In an embodiment the camera system is arranged on a headset or HMD, wherein a capture area of the camera system may record a field of view of a user. Additional cameras may be arranged elsewhere to track other parts of a body of a user. Use of additional camera(s) to cover areas outside the immediate field of view of the user may provide the benefit of allowing pre-rendering (or earlier initiation of other calculations) involved with the augmented or virtual reality rendition of those areas, or body parts contained therein, which may increase perceived performance (e.g., a more immediate response) to a user when in the virtual reality simulation. The camera system may provide information, which may include an image stream, to an application program, which may derive the position and orientation therefrom. The application program may implement known techniques for object tracking, such as feature extraction and identification.

As used herein, the term "user interface device" may include various devices to interface a user with a computer, examples of which include: pointing devices including those based on motion of a physical device, such as a mouse, trackball, joystick, keyboard, gamepad, steering wheel, paddle, yoke (control column for an aircraft) a directional pad, throttle quadrant, pedals, light gun, or button; pointing devices based on touching or being in proximity to a surface, such as a stylus, touchpad or touch screen; or a 3D motion controller. The user interface device may include one or more input elements. In certain embodiments, the user interface device may include devices intended to be worn by the user. Worn may refer to the user interface device supported by the user by means other than grasping of the hands. In many of the embodiments described herein, the user interface device is a stylus-type device for use in an AR/VR environment.

As used herein, the term "IMU" may refer to an Inertial Measurement Unit which may measure movement in six Degrees of Freedom (6 DOF), along x, y, z Cartesian coordinates and rotation along 3 axes—pitch, roll and yaw. In some cases, certain implementations may utilize an IMU with movements detected in fewer than 6 DOF (e.g., 3 DOF as further discussed below).

As used herein, the term "keyboard" may refer to an alphanumeric keyboard, emoji keyboard, graphics menu, or any other collection of characters, symbols or graphic elements. A keyboard can be a real world mechanical keyboard, or a touchpad keyboard such as a smart phone or tablet On Screen Keyboard (OSK). Alternately, the keyboard can be a virtual keyboard displayed in an AR/MR/VR environment.

As used herein, the term "fusion" may refer to combining different position-determination techniques and/or position-determination techniques using different coordinate systems to, for example, provide a more accurate position determination of an object. For example, data from an IMU and a camera tracking system, both tracking movement of the same object, can be fused. A fusion module as describe herein performs the fusion function using a fusion algorithm. The fusion module may also perform other functions, such as combining location or motion vectors from two different coordinate systems or measurement points to give an overall vector.

Note that the various embodiments of input devices described herein often refer to a "bottom portion" and a "top portion," as further described below. Note that the bottom portion (the portion typically held by a user) can also be referred to as a "first portion" and both terms are interchangeable. Likewise, the top portion (the portion typically including the sensors and/or emitters) can be referred to as the "second portion," which are also interchangeable.

Typical AR/VR System Environment

Some basic elements of a typical AR/VR system include a device to immerse the user in an AR/VR environment (e.g., an HMD, holographic emitter, audio system, haptic feedback system, or the like), one or more input devices (e.g., a stylus, remote control, joystick, pistol grip controller, etc.) that allow the user to interface with the AR/VR environment, and a tracking system to track the location of the user, which may include tracking the location of the HMD, the input device, and/or other devices (e.g., wearables, etc.). One or more computing devices (e.g., desktop computer, laptop computers, gaming platforms, entertainment/media systems, cloud-based systems, combinations thereof, etc.) can be used to communicate with and control the various input and output elements.

There are a number of different types of tracking systems that can be used to track the location/orientation of an input device, according to certain embodiments. "Outside in" systems typically use external devices to track the headset (e.g., HMD) and accessories (e.g., stylus device). The external tracking devices (e.g., cameras, IR sensors, etc.) may be placed around the room and can be directed generally toward the HMD and/or input device and can be configured to determine the position and orientation of the HMD and input device in relations to the AR/VR environment. Outside-in systems can have very latency and may be very accurate, which can be further enhanced be incorporating additional tracking devices. Some downsides associated with outside-in systems include the need to remain in a set field of view, as well as the problem of occlusion, as outside-in tracking tends to rely on line-of-sight tracking. Thus, outside-in systems typically need 360 degrees of tracking capability or risk losing a tracked location and orientation of the HMD and input device when the user turns or moves in certain positions or locations.

In "inside-out" systems, a camera or sensor array is placed on the device being tracked (e.g., HMD, stylus device) and determines how its position and/or orientation is changing in relation to the AR/VR environment. As the tracked device moves, the new tracked coordinates are updated in real-time. In some cases, inside-out tracking can be supplemented with fiducial markers to improve position/orientation tracking. One advantage is that a user can have greater freedom in movement within the virtual world without requiring sensors to be placed around the room. One disadvantage is that all computations occur within the tracked system itself, such as by the HMD, which can create performance limitations. One of ordinary skill in the art with the benefit of this disclosure would understand the many variations, modifications, and alternative embodiments of the various AR/VR systems that are available and how embodiments of the input devices (e.g., stylus devices) described herein may operate in these various systems. One such embodiment is shown and described below with respect to FIG. 1.

FIG. 1 shows a user 102 operating a stylus device 110 in an "outside-in" AR/VR environment 100, according to certain embodiments. AR/VR environment 100 can include a computer 140 and any number of peripherals, which may include a display device 142, computer mouse 144, keyboard 146, or other input/output device. User 102 is shown wearing a head-mounted display 160 and using stylus 110 to draft a letter on a virtual parchment 165. The stylus can be in wireless electronic communication with one or more external sensors 130 (1, 2, . . . n), HMD 160, computer 140, or any combination thereof. Similarly, HMD 160 can be in wireless electronic communication with one or more external sensors 130 (1, 2, . . . n), computer 140, stylus 110, or any combination thereof.

As shown in FIG. 1, user 102 can manipulate stylus 110 with high precision due to its exceptional ergonomic properties that allow extended use and reduced fatigue, which is further described below with respect to FIGS. 6A-6C. An outside-in system, as shown, may include emitters (e.g., IR LEDs) configured on stylus 110, which is further described below with respect to FIG. 7. Alternatively or additionally, stylus 110 may include a plurality of sensors for inside-out tracking, which may perform movement and orientation calculations locally (e.g., by processor(s) 210) or externally (e.g., by HMD 160, computer 140, etc.). One of ordinary skill in the art with the benefit of this disclosure would understand the many variations, modifications, and alternative embodiments thereof for tracking stylus 110 with the various types of AR/VR tracking systems in use.

Simplified System Embodiment for AR/VR Input Device

Figure 2:
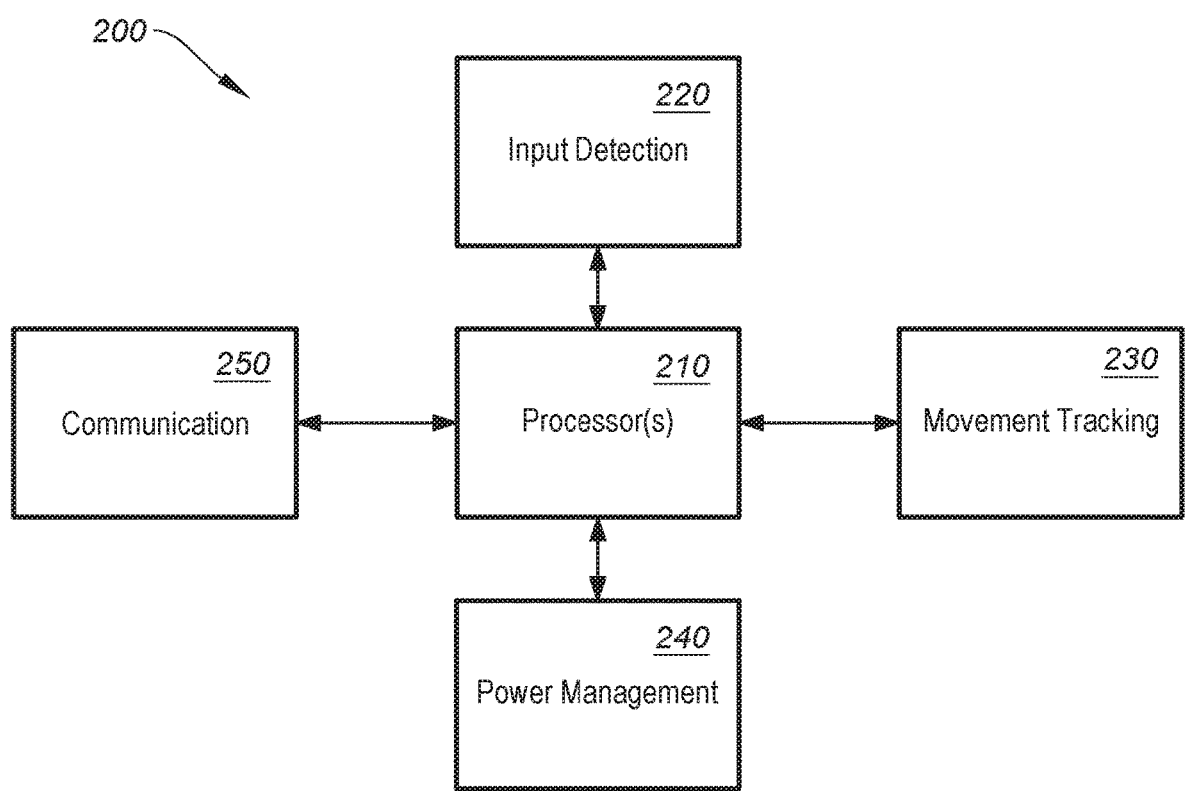
FIG. 2 shows a simplified block diagram of an AR/VR system, according to certain embodiments.

FIG. 2 shows a simplified system block diagram ("system") 200 of an input device 110, according to certain embodiments. System 200 may include processor(s) 210, input detection block 220, movement tracking block 230, power management block 240, and communication block 250. Each of system blocks 220-250 can be in electrical communication with processor 210. System 200 may further include additional systems that are not shown or described to prevent obfuscation of the novel features described herein.

In certain embodiments, processor(s) 210 may include one or more microprocessors (µCs) and can be configured to control the operation of system 200. Alternatively or additionally, processor 210 may include one or more microcontrollers (MCUs), digital signal processors (DSPs), or the like, with supporting hardware, firmware (e.g., memory, programmable I/Os, etc.), and/or software, as would be appreciated by one of ordinary skill in the art. Alternatively, MCUs, µCs, DSPs, ASIC, programmable logic device, and the like, may be configured in other system blocks of system 200. For example, communications block 250 may include a local processor to control communication with computer 140 (e.g., via Bluetooth, Bluetooth LE, RF, IR, hardwire, ZigBee, Z-Wave, Logitech Unifying, or other communication protocol). In some embodiments, multiple processors may enable increased performance characteristics in system 200 (e.g., speed and bandwidth), however multiple processors are not required, nor necessarily germane to the novelty of the embodiments described herein. Alternatively or additionally, certain aspects of processing can be performed by analog electronic design, as would be understood by one of ordinary skill in the art.

Input detection block 220 can control the detection of button activation (e.g., controls 416 of FIG. 4A, buttons, triggers, etc.), scroll wheel and/or trackball manipulation (e.g., rotation detection), sliders, switches, touch sensors (e.g., one and/or two-dimensional touch pads), force sensors, and the like. The activated input element (e.g., button press) may generate a corresponding control signal (e.g., human interface device (HID) signal) to control a computing device (e.g., computer 160) communicatively coupled to input device 110 (e.g., instantiating a "grab" function in the AR/VR environment). Alternatively, the functions of input detection block 220 can be subsumed by processor 210, or in combination therewith.

In some embodiments, input detection block 220 can detect a touch or touch gesture on one or more touch sensitive surfaces, as described above. Input detection block 220 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of input device 110 may or may not utilize touch detection or touch sensing elements.

In some aspects, input detection block 220 can control the operating of haptic devices implemented on an input device. For example, input signals generated by haptic devices can be received and processed by input detection block 220. For example, an input signal can be an input voltage, charge, or current generated by a piezoelectric device in response to receiving a force (e.g., user touch) on its surface. In some embodiments, input detection block 220 may control an output of one or more haptic devices on input device 14. For example, certain parameters that define characteristics of the haptic feedback can be controlled by input detection block 220. Some input and output parameters can include a press threshold, release threshold, feedback sharpness, feedback force amplitude, feedback duration, feedback frequency, over voltage (e.g., using different voltage levels at different stages), and feedback modulation over time. Alternatively, haptic input/output control can be performed by processor 210 or in combination therewith.

Input detection block 220 can include touch and/or proximity sensing capabilities. Some examples of the types of touch/proximity sensors may include, but are not limited to, resistive sensors (e.g., standard air-gap 4-wire based, based on carbon loaded plastics which have different electrical characteristics depending on the pressure (FSR), interpolated FSR, etc.), capacitive sensors (e.g., surface capacitance, self-capacitance, mutual capacitance, etc.), optical sensors (e.g., infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, etc.), or the like.

Movement tracking block 230 can be configured to track or enable tracking of a movement of input device 110 in three dimensions in an AR/VR environment. For outside-in tracking systems, movement tracking block 230 may include a plurality of emitters (e.g., IR LEDs) disposed on input device, as shown for example in FIG. 7, fiducial markings, or other tracking implements, to allow the outside-in system to track the input device's position, orientation, and movement within the AR/VR environment. For inside-out tracking systems, movement tracking block 230 can include a plurality of cameras, IR sensors, or other tracking implements to allow the inside-out system track the input device's position, orientation, and movement within the AR/VR environment. Preferably, the tracking implements (also referred to as "tracking elements") in either case are configured such that at least four reference points on the input device can be determined at any point in time to ensure accurate tracking. Some embodiments may include emitters and sensors, fiducial markings, or other combination of multiple tracking implements such that the input device may be used "out of the box" in an inside-out-type tracking system or an outside-in-type tracking system. Such embodiments can have a more universal, system-agnostic application across multiple system platforms.

In certain embodiments, an inertial measurement unit (IMU) can be used for supplementing movement detection. IMUs may be comprised of one or more accelerometers, gyroscopes, or the like. Accelerometers can be electromechanical devices (e.g., micro-electromechanical systems (MEMS) devices) configured to measure acceleration forces (e.g., static and dynamic forces). One or more accelerometers can be used to detect three dimensional (3D) positioning. For example, 3D tracking can utilize a three-axis accelerometer or two two-axis accelerometers. Accelerometers can further determine a velocity, physical orientation, and acceleration of input device 110 in 3D space In some embodiments, gyroscope(s) can be used in lieu of or in conjunction with accelerometer(s) to determine movement or input device orientation in 3D space (e.g., as applied in an VR/AR environment). Any suitable type of IMU and any number of IMUs can be incorporated into input device 110, as would be understood by one of ordinary skill in the art.

Power management block 240 can be configured to manage power distribution, recharging, power efficiency, and the like, for input device 110. In some embodiments, power management block 240 can include a battery (not shown), a USB-based recharging system for the battery (not shown), and a power grid within system 200 to provide power to each subsystem (e.g., communications block 250, etc.). In certain embodiments, the functions provided by power management block 240 may be incorporated into processor(s) 210. Alternatively, some embodiments may not include a dedicated power management block. For example, functional aspects of power management block 240 may be subsumed by another block (e.g., processor(s) 210) or in combination therewith.

Communications block 250 can be configured to enable communication between input device 110 and HMD 160, computer 140, or other devices and/or peripherals, according to certain embodiments. Communications block 250 can be configured to provide wireless connectivity in any suitable communication protocol (e.g., radio-frequency (RF), Bluetooth, BLE, infra-red (IR), ZigBee, Z-Wave, Logitech Unifying, or a combination thereof).

Although certain systems may not expressly discussed, they should be considered as part of system 200, as would be understood by one of ordinary skill in the art. For example, system 200 may include a bus system to transfer power and/or data to and from the different systems therein. In some embodiments, system 200 may include a storage subsystem (not shown). A storage subsystem can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled spring auto-adjustment, etc.) as described herein.

It should be appreciated that system 200 is meant to be illustrative and that many variations and modifications are possible, as would be appreciated by one of ordinary skill in the art. System 200 can include other functions or capabilities that are not specifically described here (e.g., mobile phone, global positioning system (GPS), power management, one or more cameras, various connection ports for connecting external devices or accessories, etc.). While system 200 is described with reference to particular blocks (e.g., input detection block 220), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Certain embodiments can be realized in a variety of apparatuses including electronic devices implemented using any combination of circuitry and software. Furthermore, aspects and/or portions of system 200 may be combined with or operated by other sub-systems as informed by design. For example, power management block 240 and/or movement tracking block 230 may be integrated with processor(s) 210 instead of functioning as a separate entity.

Certain Embodiments of the Input Device

As described above, some input devices for contemporary AR/VR systems include donut or ring-shaped tracking geometries that are held in a pistol grip by a separate handle. The pistol grip has ergonomic characteristics that allow users to comfortably wield larger geometric shapes and greater weight than can be comfortably held and controlled by a user when held in a pen grip (e.g., a pinch grip) between thumb and forefinger. Circular or donut shapes can create a good geometry for the placement of sensors covering 360 degree field-of-view and are typically positioned above the hand/handle or enclose the hand to ensure that their sensors are not blocked/occluded by the hands, which makes the pistol grip a good choice but at the cost of nimble dexterity and precision control, as described above. Certain embodiments of the invention include input devices having a stylus-type shape with a reduced scale, weight, and surface area with improved balance and excellent tracking, which can be held like a pen for prolonged and continuous operation (e.g., 4 hours or more) with minimal fatigue that provides for a pen-like grip for improved control and precise articulation. FIGS. 3A-3C illustrate some non-limiting implementations thereof.

FIG. 3A shows a stylus device ("stylus") 310(1) configured for operation in an AR/VR environment, according to certain embodiments. Stylus device 310(1) includes a bottom portion (also referred to as a "front portion") 312(1) that is typically held by a user while stylus 310(1) is in use, and a top portion (also referred to as a "back" or "rear portion") 314(1) with a hexagonal loop geometry configured for excellent tracking properties, as further discussed below with respect to FIGS. 4A-7. FIG. 3B shows a stylus 310(2) with a similar bottom portion 312(2) and a top portion 314(2) with a narrower hexagonal loop geometry. FIGS. 3C-3E show a stylus 310(3) with a flatter bottom portion 312(3) profile and a question mark shaped top portion 314(3). Each embodiment has a plurality of planar facets oriented in different directions, which can include sensors (e.g., IR sensors) and/or emitters (e.g., IR LEDs) disposed thereon to facilitate tracking the position, orientation, and movement of the stylus device in the AR/VR environment, as further described below with respect to FIG. 7.

Alternatively or additionally, the stylus devices shown in FIGS. 3A-3C or described within the present document may be held in alternative configurations. For example, a user can hold the stylus in the pistol grip configuration with bottom portion 312(1) facing down, and top portion 314(1) facing up, to make for an adaptable input device that can be used as both a stylus or an improved pistol grip interface. One of ordinary skill in the art with the benefit of this disclosure would understand the many variations, modifications, and alternative embodiments thereof.

FIG. 4A shows aspects of a stylus device ("stylus") 410 for use in an AR/VR environment, according to certain embodiments. Stylus 410 can include a bottom portion 412 with one or more input elements 416. Bottom portion 412 can be shaped in a pen-like configuration for a user to hold and manipulate, for instance, with a pinch-grip (e.g., see FIG. 5A), for improved control, dexterity, and precision over pistol-gripped controllers. Typically, bottom portion 412 is configured to be substantially linear, as shown in FIG. 4A, but may incorporate non-linear portions, curves, or cross-sections. Input elements 416 can include any number of buttons, controls, touch sensitive sensors, or other input element configured to generate control signals in response to being activated by the user's hand. Bottom portion 412 may include a tip configured to operate as an interface between the stylus device and objects within the AR/VR environment, which can include pen-like operation, a pointer, a "spray" nozzle in a photo editing software suite, or other application. In some embodiments, the tip may include an active sensor (e.g., a pressure sensor) such that stylus 410 can detect contact or impact with real-world objects and/or surfaces. Some or all of input elements 416 may be controlled by input detection block 220, processor 210, or a combination thereof, as described above with respect to FIG. 2.

In some embodiments, top portion 414 of the housing can be any suitable shape, such as a loop (e.g., see FIG. 3A, 3B, 4A-C) or protrusion (e.g., see FIG. 3C) that preferably is non-linear and is bent to traverse through three dimensions to ensure accurate tracking characteristics, as described below. In some embodiments, top portion 414 can include a polygonal loop (e.g., a hexagonal loop, diamond shaped loop, octagonal loop, pentagonal loop, hemispheric loop, circular loop, etc.) that traverses three dimensions and may include a polygonal cross-section (e.g., hexagonal cross-section, triangular cross-section, etc.) through at least a portion of the polygonal loop. Note that the figures show a hexagonal loop and hexagonal cross-section and will be referred to as such for the purposes of explanation. However, as would be appreciated by one of ordinary skill in the art would understand that the concepts described herein could apply to other polygonal shapes and cross-sections. In some embodiments, the angle between each plane (e.g., between each bend) of the hexagonal loop and/or the cross-section thereof may be approximately 30 degrees, but not necessarily symmetric (e.g., some angles may be greater or less than 30 degrees). Other angles are possible (e.g., 45 degrees, 60 degrees, 15 degrees, etc.) and different angles may be used throughout top portion 414 or any portion of stylus 410. The hexagonal loop may have a portion that is bent longitudinally downward toward a line co-linear with the first portion of the housing (e.g., in-line with a wrist of a user when the stylus is in use), which can prevent obfuscation for the user's line-of-sight when operating the stylus device, as further described below. In general, sharper bends (e.g., 30 degrees or more) tend to result in sensors/emitters being situated farther apart in three dimensional space and more easily distinguished from one another for easier and more reliable tracking (e.g., differentiating between four or more detected sensors/emitters). Conversely, shallow bends (e.g., less than 20 degrees) tend to result in sensors/emitters being situated closer together in three dimensional space and may be harder to track with less reliable tracking. Typically, a bend of 30-60 degrees can be preferable, although bends as low as 15 degrees may operate satisfactorily in robust detection systems. In some cases, using very steep bends may improve tracking performance, but may present ergonomic tradeoffs including occlusion (see, e.g., FIG. 6A), awkward weight distribution (see, e.g., FIG. 6B-6C), or the like.

The polygonal loop can include a number of planar facets that may be oriented to face a different direction from one another in three dimensional space. A number of emitters or sensors can be configured on some or all of the planar facets, which can facilitate a tracking of the stylus device in three-dimensional space within the AR/VR environment. The use of emitters (e.g., infra-red LEDs) and/or sensors (e.g., infra-red detectors) may depend on the type of tracking infrastructure used by the AR/VR system. The planar facets can be oriented such that at least four of the planar facets are visible (e.g., detectable LED emission) from any point 360 degrees axial to the orientation of the stylus device (e.g., completely around the sides of the stylus device), although some embodiments may have facets configured on different portions of the hexagonal loop that allow at least 3 or 4 to be visible from anywhere around the stylus device. As indicated above, having the loop traverse three dimensions can ensure that emitter and/or sensors can be "seen" (i.e., detected via point-of-sight) from any point 360 degrees around the device. Note that during operation, a user may obfuscate a line-of-sight between sensors/emitters of the input device and external tracking elements, thus ensuring that many points (e.g., four or more) on the input device are detectable regardless of the orientation of the input device can improve the likelihood of reliable, continuous, and uninterrupted tracking as the inevitable occlusion of some sensors/emitters due to user features (e.g., body, arms, etc.) as the input device is being used can be compensated by additional sensors/emitters that can simultaneously still be detected and tracked. Referring to FIG. 4B, the hexagonal loop is shown to traverse the x-axis 450 and y-axis 452 in a Cartesian coordinate space. FIG. 4C illustrates how stylus 410 traverses the z-axis 454. In some embodiments, the facets may be configured symmetrically or asymmetrically along the loop. In some cases, asymmetric placement of facets may be preferable for tracking purposes as every combination of detected sensors/emitters (which, for the purpose of explanation, can be referred to as "tracking points") will be a unique constellation, while symmetric placement may present multiple possibilities.

Although it appears that the facets shown in FIGS. 3A-4C may not necessarily be configured on every portion of top portion 414. Some embodiments may have facets configured completely around top portion 414; more or fewer facets; facets with different polygonal shapes, sizes, and dimensions; continuous or discontinuous patterns of facets, or any combination thereof as would be appreciated by one of ordinary skill in the art with the benefit of this disclosure.

In some cases, certain embodiments may not include facets but instead smooth and/or curved surfaces. In such cases, some embodiments may have inlayed (or non-inlayed) window surfaces to install sensors and/or emitters. One of ordinary skill in the art with the benefit of this disclosure would understand the many variations, modifications, and alternative embodiments thereof.

In some implementations, input device 410 can have the sensors/emitters configured for universal application in inside-out systems, outside-in systems, room-scale systems, world-scale systems, systems that detect/view three or more sensors/emitters on input device 410 from a position lateral to input device 410 (e.g., "light-house" based systems) or for systems that can detect three or more sensors/emitters from the back (e.g., HMD-based detection), or the like. Some embodiments may be optimized for any one of these types of systems, more than one, or all of these systems, including systems not expressly described herein but contemplated by the four corners of the present disclosure, as would be appreciated by one of ordinary skill in the art.

In some implementations, a center of gravity for the stylus device can be at the interface between the top portion and the bottom portion. While in use, the top portion is compact enough such that it may not extend beyond the wrist of the user laterally (e.g., does not hang over the edge of the arm) when the stylus device is in use. One of ordinary skill in the art with the benefit of this disclosure would understand the many variations, modifications, and alternative embodiments thereof.

In certain embodiments, any or all of system 200 can be incorporated into stylus 410, or any of the novel input devices described herein (e.g., stylus 110, 310, 410, 510, 610, 710). For example, processor(s) 210 and communications block ("module") may be disposed within stylus 410 to establish a wireless electronic communication between the stylus device and at least one host computing device (140).

In further embodiments, input device 410 may be used in non-VR/AR/MR environments. For example, the position, orientation, movement, and operation of input device 410 can also be tracked for use with a smart whiteboard in a classroom scenario, or other real-world application where the tracking may be used in a non-VR/AR/MR environment. In some embodiments, an input device may include a tracking portion (e.g., a polygonal loop with sensors/emitters configured as described above) with no bottom portion (e.g., no pen handle or other user manipulable portion). One of ordinary skill in the art with the benefit of this disclosure would understand the many variations, modifications, and alternative embodiments thereof.

Input Device Grip Versatility

The input devices described herein can offer excellent control, dexterity, and precision for a variety of applications. Further, these input devices may be held in a variety of configurations to adapt to a user's preference.

Figure 5A:
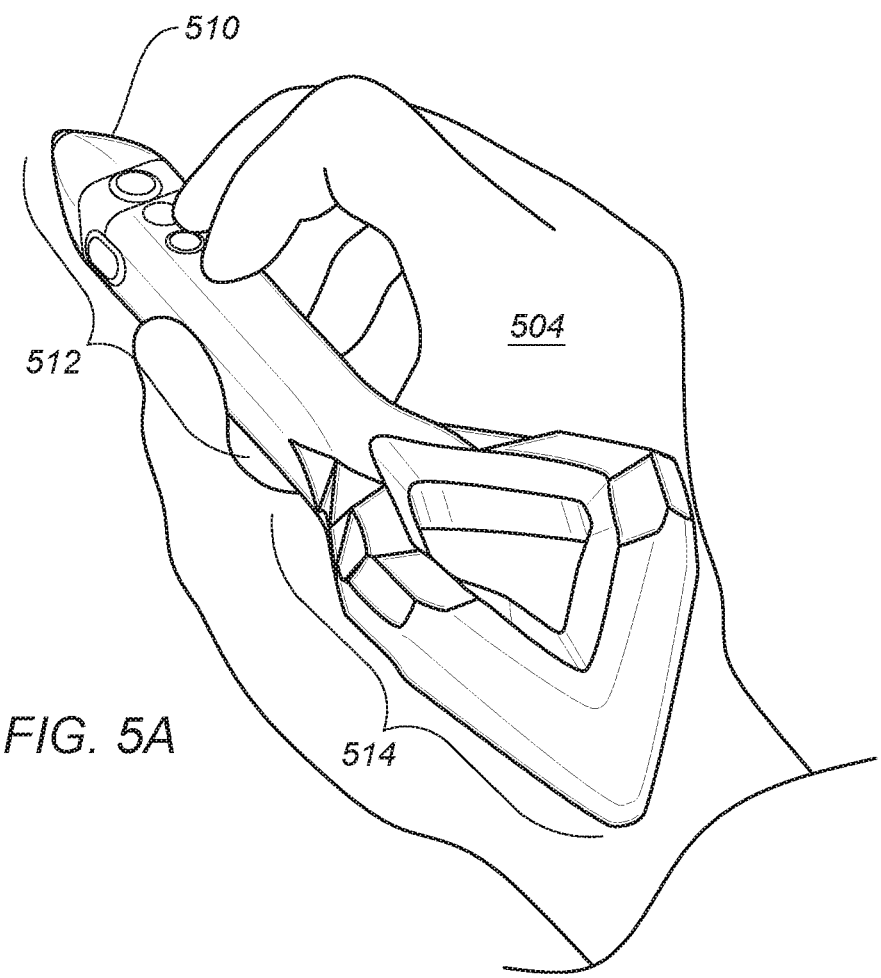
FIG. 5A shows a grip-style for interfacing with the stylus device, according to certain embodiments.

FIG. 5A shows a pinch grip-style for interfacing with the stylus device 510, according to certain embodiments. A user's hand 504 is shown holding bottom portion 512 of stylus 510 between their thumb and fingers (e.g., index finger and middle finger), with top portion 514 resting on a portion of the user's hand between the thumb and index finger (the "purlicue"). A user may use only the index finger, or there or more fingers in a preferred grip style. The user may grip higher up or lower on bottom portion 512 as desired.

Figure 5B:
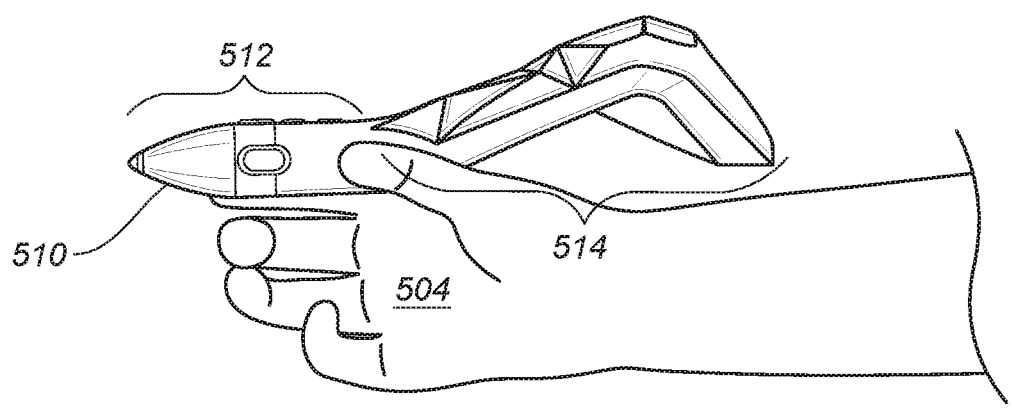
FIG. 5B shows a second grip-style for interfacing with the stylus device, according to certain embodiments.

FIG. 5B shows a second grip-style for interfacing with the stylus device 510, according to certain embodiments. A user's hand 504 is shown holding bottom portion 512 of stylus 510 in a different manner where stylus 510 is propped up, rather than gripped, such that the index finger and thumb orients the stylus, while the stylus is supported by (rests on) the purlicue of hand 504. This configuration may be useful for applications that required pointing or aiming, such as a virtual projectile in a gaming application, a virtual telescope or set of binoculars, or other suitable application. One of ordinary skill in the art with the benefit of this disclosure would understand the many variations of interfacing with stylus 510.

Ergonomic Advantages of Certain Embodiments of the Input Device

The stylus presents a number of ergonomic advantages over other controller types (e.g., remote controls, pistol grip controls, etc.) when used in an AR/VR environment.

Figure 6A:
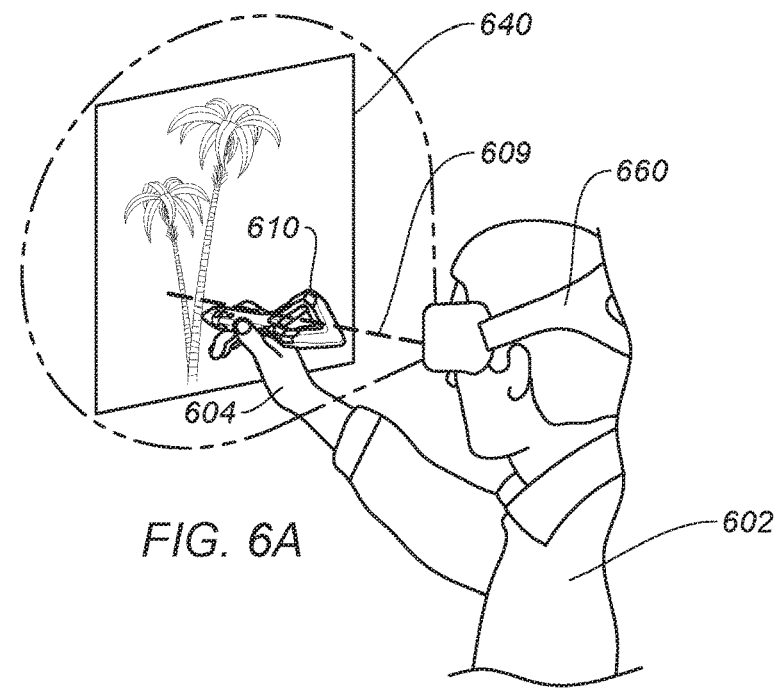
FIG. 6A shows aspects of certain ergonomic advantages of the stylus device, according to certain embodiments.

FIG. 6A shows aspects of certain ergonomic advantages of the stylus device 610, according to certain embodiments. User 602 is shown drawing a landscape on a projected virtual canvas 640 (rendered by HMD 660) using stylus 610. Note that stylus 610 is held at eye level, yet user's line-of-sight 609 remains unobstructed. In conventional devices, such as pistol grip controllers with tracking mechanisms ("donuts") configured around or above the hand, a clear line-of-sight at eye level may not be possible as the tracking features would be likely to occlude the user's vision. An unobstructed line-of-sight 609 is made possible, in part, to the manner in which the tracking portion (e.g., top portion 514) bends out of the way, yet retains its projection in three-dimensions. Although the embodiments depicted herein show the tracking portion of various stylus devices bend up and then back down, it should be noted that other embodiments are possible that still project in three dimensions. For example, some embodiments may first project downwards and then upwards, some may not include a complete loop or may be more circular or assume other polygonal shapes (e.g., square, pentagram, octagon, etc.). One of ordinary skill in the art with the benefit of this disclosure would understand the many variations, modifications, and alternative embodiments thereof.

Figure 6B:
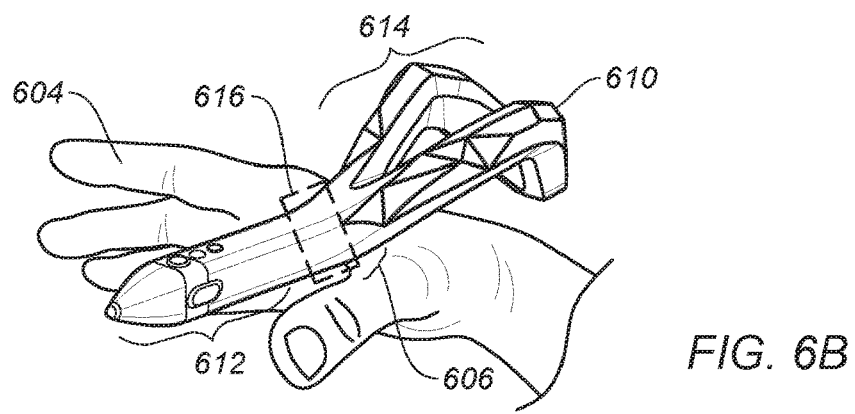
FIG. 6B shows further aspects of certain ergonomic advantages of the stylus device, according to certain embodiments.

FIG. 6B shows further aspects of certain ergonomic advantages of the stylus device, according to certain embodiments. In FIG. 6B, stylus 610 is shown to be advantageously balanced with a center of gravity 616 at the interface between top portion 612 and bottom portion 614, such that stylus 610 can balance unsupported on a space between a forefinger and thumb of the user's hand (the purlicue) 606 when the user's hand is oriented in an in-use position, as shown. Note that the center of gravity can be shifted forward or backward spending on the weight, length, or thickness of the housing; the distribution of the various electronics within stylus 610 (e.g., system 200); the length, configuration, dimensions, and orientation of the protrusions (e.g., hexagonal loop) of top portion 614, or other features. Thus, some embodiments may have varied features from those shown in FIG. 6B, however a similar center of gravity 616 can be achieved by adjusting the various parameters listed above. One advantage of having a balanced center of gravity includes having better control of stylus 610, as the user will not have to contend with gravity pulling the stylus forward or backward, which can be challenging when trying to articulate precise movements. In contrast, contemporary pistol grip controllers are often heavy, unwieldy, and have significant weight compensation issues to contend with, particularly if they were manipulated upside-down in a similar manner that simulate the use of stylus 610. For example, the weight, large surface areas, and large geometric portions would awkwardly distribute weight, overload the user's hand stabilizer muscles by compensating for tipping forward and backwards or left and right, and make it difficult to accurately control the tip, resulting in low precision and fast fatigue. Thus, a balanced center of gravity can reduce hand fatigue, which may allow longer periods of continuous use for the user. In some embodiments, stylus 610 can be balanced longitudinally and latitudinally (i.e., length-wise and width-wise).

Figure 6C:
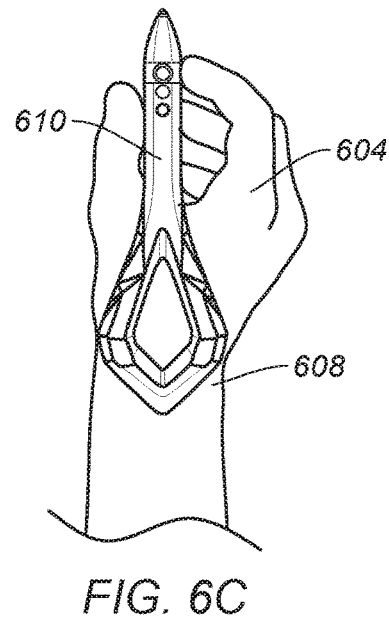
FIG. 6C shows more aspects of the ergonomic advantages of the stylus device, according to certain embodiments.

FIG. 6C shows more aspects of the ergonomic advantages of the stylus device, according to certain embodiments. In FIG. 6C, a top plan view of the stylus device is shown during operation by a user. The user's hand 604 holds stylus 610 in a manner such that the orientation of stylus 610 is in-line with the user's wrist 608. Note that the top portion of stylus 610 does not extend laterally beyond the wrist of the user when the stylus device is in use. For example, the hexagonal loop does not extend beyond the edge of the wrist. In some embodiments, small portions of the hexagonal loop may extend slightly beyond the edge of the user's wrist 608 (e.g., 1-2 cm), but the majority of the weight of the loop remains centered over the user's wrist. This can be ergonomically advantageous as the user does not have to content with gravity-induced forces pulling down on either edge of the stylus device, which may cause inadvertent tilt, or further contribute to early fatigue during long continuous use.

Tracking Geometries for Certain Embodiments

To ensure a consistent six degrees-of-freedom in motion for input devices in virtual and augmented reality systems, these devices should be tracked and/or should report their position in three dimensional space according to a coordinate system of sensors/emitters. To ensure accuracy, the sensors should ideally report unique, non-planar four point references to the system software continuously and through all angles of rotation naturally occurring through the various ranges of motions produced by the user. This range of motion may result from the performance of activities such as, but not limited to: drawing, painting, writing, pointing, etc., in free space while the device is held, for instance, in an opposable thumb pinch grip. The system should be able to recognize the pose, direction and orientation of the device. To prevent occlusion of the sensors, which may occur for instance relative to room-scale system "lighthouses" by the hand holding the form factor, the geometry of the sensor enclosure can be positioned to the rear of the device where it overhangs the users wrist (see, e.g., FIG. 6A-C). This geometric shape and it's relative performance in the system is further constrained by the desire to minimize ergonomic factors such as scale, weight and the advantage of a balanced form factor. Some embodiments of these described shapes have been shown in previous figures presented herein.

In operation, when the input device is static (not moving), the AR/VR tracking system uses three unique points to deduce the orientation and position of the device. If the system loses "sight" of any of these three points, the tracking may be lost. To ensure consistent tracking while in motion/rotation the system should be able to continuously recognize four points to enable the transition from one unique set of three points to another. To meet this system performance parameter, some embodiments include a geometric shape (e.g., hexagonal loop with hexagonal cross-section) that forms a closed three dimensional loop which bends sharply trough each X, Y and Z axis of a Cartesian coordinate system, as shown in FIGS. 6B-6C. In some cases, the effect of these geometries is to present a series of unique non-planar sensor locations with overlapping viewing cones that cover 360 degrees projecting from the input device. In other words, the system should be able to recognize the input device in any position or rotational orientation. In some embodiments, the form can be symmetric to satisfy ergonomic factors (e.g., balance), while the sensor locations may be asymmetric to aide in pattern recognition. Each sensor can also be angled uniquely to create further distinction between sensors or emitters configured on the left and right side. In some implementations, facets are included to provide unique angles and planar "windows." Another advantage of preset facets is that sensors and/or emitters can be installed under normal or even sub-normal manufacturing tolerances and still be oriented correctly given the comparatively large installation surface.

Figure 7:
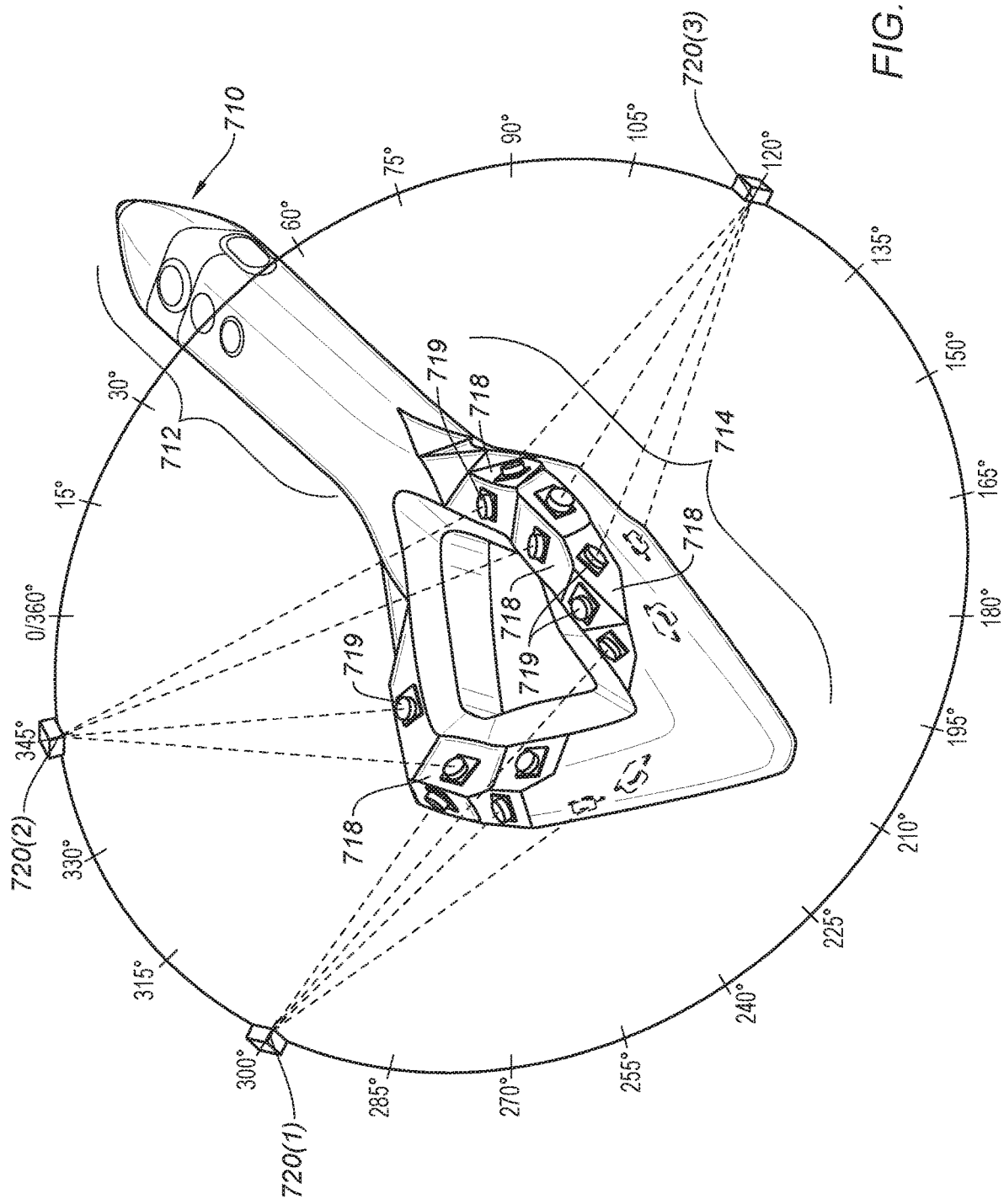
FIG. 7 shows aspects of the configuration and operational performance of the sensor/emitter array of the stylus device, according to certain embodiments.

FIG. 7 shows aspects of the configuration and operational performance of the sensor/emitter array of a stylus device 710, according to certain embodiments as described above. Stylus 710 includes bottom portion 712 and top portion 714, and may be similar to the embodiments shown and described above for the purposes of simplifying the explanation of the inventive concepts that follow. Top portion 714 can include a hexagonal loop populated with a number of polygonal planar facets 718. Some or all of planar facets 718 may be populated with a sensor (e.g., IR sensor), emitter (e.g., IR LED), fiducial mark(s), and/or other tracking element that can be used to facilitate the tracking of stylus 710 in three dimensional space in an AR/VR environment. In some embodiments, the plurality of planar facets can be oriented such that at least four of the sensors/emitters configured on their corresponding planar facets are visible from any point 360 degrees axial to the orientation of the stylus device. As the stylus 710 moves and rotates, the at least four sensors/emitters may change. For example, a first set of four or more sensors/emitters may be visible from an external sensor, and as the stylus rotates some of the first set of four or more may still be visible, while others drop from view and new ones become visible while still maintaining the four or more minimum tracking criteria to ensure continuous and accurate tracking. In some cases, emitters may project their corresponding signals over any suitable range (e.g., 15 degree cone, 30 degrees, etc.), such that there can be signal overlap and broader coverage, which may allow a fewer number of emitters to be used to guarantee 360 degrees of tracking coverage. Similarly, sensors may detect at any suitable range (e.g., cone with 15 degree radii, 30 degrees, etc.) for inside-out detection systems. Different ranges are possible and generally, greater tracking resolution may correspond to a larger number of detectable sensors/emitters with smaller radii and vice versa, as would be appreciated by one of ordinary skill in the art with the benefit of this disclosure.

To illustrate this point, several external tracking sensors 720(1-3) are shown in FIG. 7. As a point of reference, a 360 degree reference is provided that extends axially from the housing (e.g., bottom portion 712) and is configured approximately around the center of the hexagonal loop with a 0 degree reference set at approximately normal to the surface of the bottom portion having the three visible buttons. External sensors 720(1-3) (e.g., a "lighthouse" sensors) are shown to be located at 300 degrees, 345 degrees, and 120 degrees, respectively, relative to the shown orientation of stylus 710.

Referring to FIG. 7, the geometry and performance of stylus 710 is shown to be designed to be detected primarily from its sides at an elevated angle. Some embodiments may employ more sensors/emitters, including some added to the front section (lower portion 712) and on the back to improve tracking from directly in front of the stylus 712 or directly behind it, as may occur with HMD-mounted tracking systems. One of ordinary skill in the art with the benefit of this disclosure would understand the many variations, modifications, and alternative embodiments thereof. While it may not be expressly stated in each and every embodiment described herein, it should be understood that any features described in one particular embodiment can be applied to any of the embodiments contemplated within this disclosure, and it can be assumed that one of ordinary skill in the art with the benefit of this disclosure would understand how to mix and match said features in any desired combination.

As used in this specification, any formulation used of the style "at least one of A, B or C", and the formulation "at least one of A, B and C" use a disjunctive "or" and a disjunctive "and" such that those formulations comprise any and all joint and several permutations of A, B, C, that is, A alone, B alone, C alone, A and B in any order, A and C in any order, B and C in any order and A, B, C in any order. There may be more or less than three features used in such formulations.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

Unless otherwise explicitly stated as incompatible, or the physics or otherwise of the embodiments, example or claims prevent such a combination, the features of the foregoing embodiments and examples, and of the following claims may be integrated together in any suitable arrangement, especially ones where there is a beneficial effect in doing so. This is not limited to only any specified benefit, and instead may arise from an "ex post facto" benefit. This is to say that the combination of features is not limited by the described forms, particularly the form (e.g. numbering) of the example(s), embodiment(s), or dependency of the claim(s). Moreover, this also applies to the phrase "in one embodiment", "according to an embodiment" and the like, which are merely a stylistic form of wording and are not to be construed as limiting the following features to a separate embodiment to all other instances of the same or similar wording. This is to say, a reference to 'an', 'one' or 'some' embodiment(s) may be a reference to any one or more, and/or all embodiments, or combination(s) thereof, disclosed. Also, similarly, the reference to "the" embodiment may not be limited to the immediately preceding embodiment.

Certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks. Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

For example, any number of computer programming languages, such as C, C++, C# (CSharp), Perl, Ada, Python, Pascal, Small Talk, FORTRAN, assembly language, and the like, may be used to implement machine instructions. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of function The foregoing description of one or more implementations provides illustration and description, but is not intended to be exhaustive or to limit the scope of the invention to the precise form disclosed. Modifications and variations are possible in light of the above teachings or may be acquired from practice of various implementations of the present disclosure.

What is claimed is:

1. A stylus device configured for use in an augmented/virtual (AR/VR) reality environment, the stylus comprising:
   a housing including:
      a first portion; and
      a second portion;
   one or more processors disposed in the housing; and
   a communications module disposed in the housing and controlled by the one or more processors, the communications module configured to establish a wireless electronic communication channel between the stylus device and at least one host computing device,
   wherein the first portion of the housing is substantially linear and is configured to be held by a user's hand while the stylus device is in use, the first portion including:
      an input element configured to generate control signals in response to being activated by the user's hand; and
      a tip at an end of the first portion configured to operate as an interface between the stylus device and objects within the AR/VR environment,
   wherein the second portion of the housing is non-linear and bends to traverse through three dimensions, and
   wherein the second portion of the housing includes a plurality of emitters or sensors configured for facilitating a tracking of the stylus device in three-dimensional space within the AR/VR environment.

2. The stylus device of claim 1 wherein a section of the second portion of the housing forms a polygonal loop.

3. The stylus device of claim 2 wherein the second portion of the housing includes a polygonal cross-section through at least a portion of the polygonal loop.

4. The stylus device of claim 1 wherein the second portion of the housing includes a plurality of planar facets, wherein the plurality of emitters or sensors are configured on the plurality of planar facets.

5. The stylus device of claim 4 wherein each of the plurality of planar facets is oriented to face a different direction from one another in three-dimensional space.

6. The stylus device of claim 4 wherein the plurality of planar facets are oriented such that at least four of the planar facets are visible from any point 360 degrees around the stylus device.

7. The stylus device of claim 1 wherein a center of gravity for the stylus device is at an interface between the second portion and the first portion.

8. The stylus device of claim 1 wherein the stylus device is balanced longitudinally and latitudinally at an interface between the second portion and the first portion.

9. The stylus device of claim 1 wherein the first portion of the housing is configured to be held by a user's hand in a pen-grip configuration.

10. A stylus device configured for use in an augmented/virtual (AR/VR) reality environment, the stylus device comprising:
    a housing including:
       a substantially linear first portion configured to be held by a user's hand while the stylus device is in use; and
       a second portion that is non-linear and is bent to traverse through three dimensions, wherein the second portion of the housing includes a plurality of emitters or sensors configured for facilitating a tracking of the stylus device in three-dimensional space within the AR/VR environment,
    wherein a center of gravity for the stylus device is at the interface between the second portion and the first portion such that the stylus device is configured to balance unsupported on a space between a forefinger and thumb of the user's hand when the user's hand is oriented in an input device in-use position.

11. The stylus device of claim 10 further including a section of the second portion that is bent longitudinally toward a line co-linear with the first portion of the housing.

12. The stylus device of claim 11 wherein a section of the second portion of the housing forms a hexagonal loop and the housing includes a hexagonal cross-section through at least a portion of the hexagonal loop.

13. The stylus device of claim 10 wherein the second portion of the housing includes a plurality of planar facets, wherein the plurality of emitters or sensors are configured on the plurality of planar facets.

14. The stylus device of claim 13 wherein each of the plurality of planar facets are oriented to face a different direction from one another in three-dimensional space.

15. The stylus device of claim 13 wherein the plurality of planar facets are oriented such that at least four of the plurality of planar facets are visible from any point 360 degrees around the stylus device.

16. The stylus device of claim 10 wherein the stylus device is balanced longitudinally and latitudinally at an interface between the second portion and the first portion.

17. An input device configured for use in an augmented/virtual (AR/VR) reality environment, the input device comprising:
a housing including:
a first portion; and
a second portion;
wherein the first portion of the housing is configured to be held by a user's hand while the input device is in use,
wherein the second portion of the housing is non-linear and bent to traverse three dimensions and includes a section forming a hexagonal loop having a hexagonal cross-section,
wherein the hexagonal loop includes a section that is bent longitudinally toward a line co-linear with the first portion of the housing, and
wherein the hexagonal loop includes a plurality of planar facets, wherein a plurality of emitters or sensors are configured on the plurality of planar facets that are configured for facilitating a tracking of the input device in three-dimensional space within the AR/VR environment.

18. The input device of claim 17 wherein each of the plurality of planar facets are oriented to face a different direction from one another in three-dimensional space, and
wherein each of the plurality of planar facets are oriented such that at least four of the planar facets are visible from any point 360 degrees around the input device.

* * * * *